Feb. 25, 1936. H. D. SMITH 2,031,862
PNEUMATIC AUTOMOBILE SPRING
Filed July 23, 1934 2 Sheets-Sheet 1
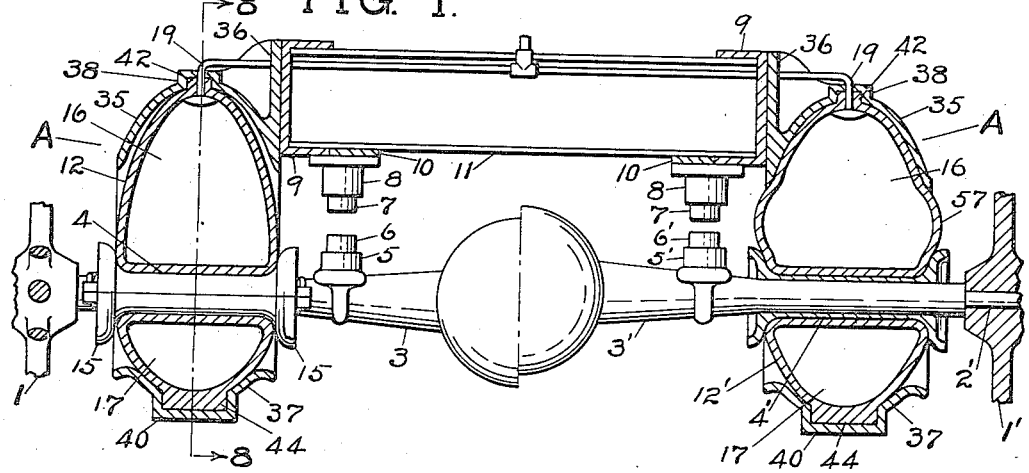
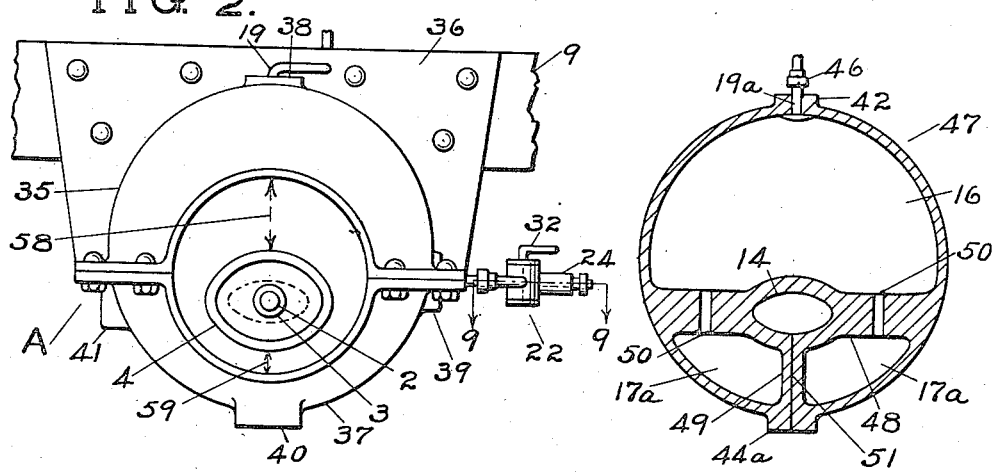
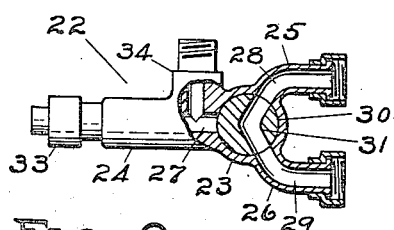
INVENTOR
Herschel D. Smith
BY
Lucian E. Jackson
Attorneys Feb. 25, 1936.   H. D. SMITH   2,031,862
PNEUMATIC AUTOMOBILE SPRING
Filed July 23, 1934   2 Sheets-Sheet 2
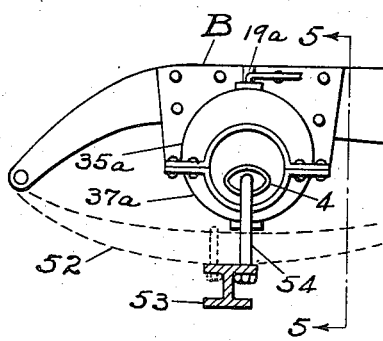
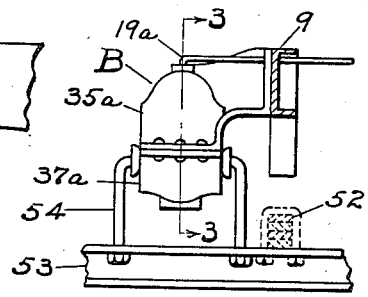
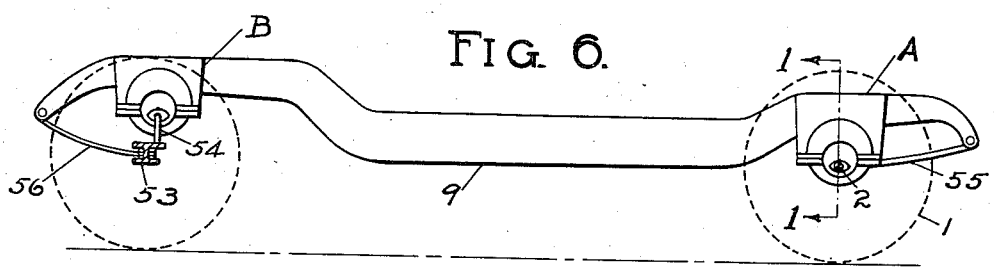
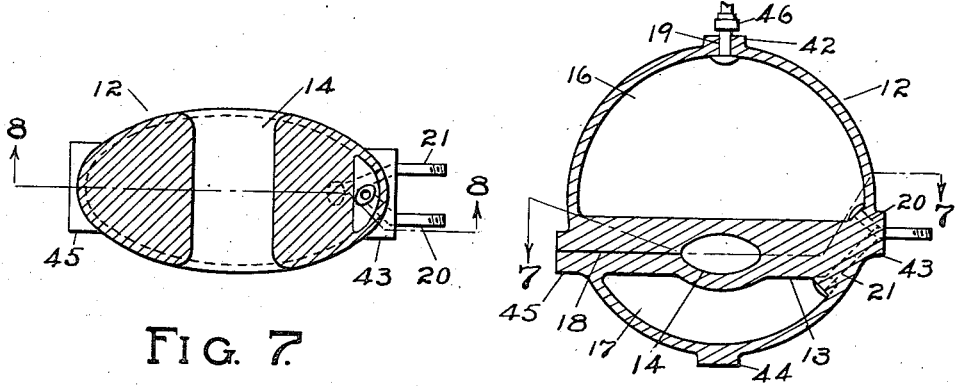
INVENTOR
Herschel D. Smith
BY
Lucian E. Jackson
Attorney Patented Feb. 25, 1936

2,031,862

UNITED STATES PATENT OFFICE 2,031,862

PNEUMATIC AUTOMOBILE SPRING

Herschel D. Smith, Buffalo, N. Y., assignor of one-half to Harris P. Richardson, Buffalo, N. Y.

Application July 23, 1934, Serial No. 736,536

12 Claims. (Cl. 267—35)

This invention relates to springs for vehicles and more particularly to means for supporting the bodies of automobiles on their axles with a resilient pneumatic structure in place of the present metal leaf springs.

One object of the present invention is to provide resilient supporting or suspension means for vehicle bodies which will function quietly in a floating manner, and having no metal to metal contact does away with squeaks while requiring no lubrication.

Another object is to provide a vehicle body support, the resilience of which can be varied at will.

Another object is to provide means in one resilient unit for carrying weight and at the same time absorbing shocks and vibration.

Another object is to provide means for controlling the proportion of shock absorbing means in relation to that of the weight carrying means.

With these objects in view, the invention consists in certain features of novelty in the construction, combination and arrangement of parts by which the said objects and certain other objects which will hereinafter appear are attained, the invention being more particularly pointed out in the claims.

In the drawings accompanying and forming a part of this specification,

Figure 1 is a sectional elevation, on line 1—1 of Fig. 6, through the frame at the rear axle of an automabile showing my improved pneumatic springs in section and with the right half of the axle housing in a higher plane than the left half.

Fig. 2 is a left side elevation of one of my pneumatic springs as attached to an automobile at the rear axle without the wheel.

Fig. 3 is a sectional elevation on line 3—3 of Fig. 5 showing one form of my air container.

Fig. 4 is a side elevation of one of my pneumatic springs as attached to an automobile at the front axle to replace an ordinary leaf spring and with the axle in section.

Fig. 5 is a sectional elevation on line 5—5 of Fig. 4 showing the automobile frame in section and rear view of my spring.

Fig. 6 is a side elevation of an automobile frame with my springs attached and showing a method of connecting the front and rear axles to the frame ends by means of radius rods.

Fig. 7 is a sectional plan on line 7—7 of Fig. 8 showing another form of my air container.

Fig. 8 is a sectional elevation on line 8—8 of Figs. 1 and 7.

Fig. 9 is a plan partly in section on line 9—9 of Fig. 2 showing the valve for the air container of Figs. 7 and 8.

Referring to the drawings, 1 denotes the driving or left rear wheel of an automobile, indicated in Fig. 6 by a dotted outline and in Fig. 1 by a portion of the hub. 2 is the rear axle (Figs. 2 and 6). 3 is the axle housing. 4 is a spool on the housing 3 and split for convenience in assembling on said axle housing without removing wheel 1, and bolted together as shown. 5 is a cup on housing 3 for holding a rubber bumper 6 to co-operate with the rubber bumper 7 in the cup 8 attached to the frame channel 9 and distance piece 10, the latter attached to the cross frame channel 11.

The right half of the axle housing (Fig. 1) is shown in an elevated position with reference to the left half, as when the right rear wheel rises in running over an obstruction on the road. Said right half of axle housing and its connected parts are therefore designated as, right rear wheel 1'; right rear axle 2'; right rear axle housing 3'; right rear spool 4'; right rear cup 5' and bumper 6'. The pneumatic spring as a whole consists of a resilient air container with an outer metal casing to be attached to a car frame and mounted on a spool through said air container to be attached to the axle of said car and designated as A as shown for the rear axle and B for the front axle.

The air container 12 (Figs. 1, 2, 7, and 8 shown adapted to the rear axle) is preferably of rubber or rubber and fabric. As shown on the left of Fig. 1 the air container 12 is normally oval or egg shaped in vertical cross section; circular shaped in side or sectional elevation as shown in Fig. 8; and elliptical in sectional plan view as shown in Fig. 7.

Referring to Fig. 8, at or about one third of the distance from the bottom of air container 12 and at its greatest thickness is provided a partition 13 having an elliptical hole 14 therethrough for mounting on the spool 4. Spool 4 is also of elliptical shape to fit the hole 14 to overcome the turning of the axle housing 3 due to the torque developed in driving the car. 15 are flanges on the ends of spool 4 between which the air container 12 is located when mounted on said spool 4 to prevent the side shifting of the axle housing 3 in relation to the frame 9. Partition 13 divides the air container 12 into a large upper air chamber 16 and a smaller lower air chamber 17 and by means of the spool 4 on axle housing 3 wholly or partially absorbs the drive on the car imparted by the rear wheels and axle depending on the drive system employed. The partition 13 is split on the line 18 for ease in mounting the air container 12 on the spool 4.

19 is a tube communicating with air chamber 16 and is shown in Fig. 1 as connected between the two pneumatic springs of the rear axle to maintain an equalized pressure and can also be connected to the front pneumatic springs and an air gauge on the instrument board (not shown). 46 is a union on tube 19 for convenience in installing. Tube 19 can also be used to inflate the air chambers as for the modification in Fig. 3 but for the air container 12 in Figs. 1, 2, 7, and 8, a separate air inflation means connected into the upper and lower chambers through the partition 13 is preferred as follows: Connected into the upper air chamber 16 is a tube 20 and into the lower air chamber 17 is a tube 21. Tubes 20 and 21 are threaded on their outer ends for convenience in attaching a valve 22 (Fig. 9). The valve 22 consists of a body 23 having a stem 24 and two branches 25 and 26 with passages respectively of 27, 28 and 29 controlled by the central plug 30. A passage 31 in plug 30 is adapted to be brought into register with any two of the passages 27, 28, and 29 or out of register with all of them.

The branches 25 and 26 of valve 22 are adapted to be connected to the tubes 20 and 21 (Fig. 7) by means of threaded slip collars on said branches and the valve is shown so connected in Fig. 2 and with a handle 32 for revolving the plug 30. The stem 24 is constructed like an ordinary tire tube stem and having the ordinary tire tube valve (not shown) for introducing air through passages 27, 31, and 28 to one air chamber, as 16, or through passages 27, 31 and 29 to the other air chamber 17 of air container 12. 33 is an ordinary tire valve cap for use on stem 24 and a similar cap is used on boss 34.

After the air chambers 16 and 17 have been inflated they can be maintained at different pressures or the plug 30 can be moved to the position shown in Fig. 9 so the passage 31 of the plug 30 connects the passages 28 and 29 to equalize the pressures of said chambers 16 and 17. When it is desirable to control the flow of air between chambers 16 and 17 and the rate of equalizing the difference in the pressures in said chambers due to load and road conditions the plug 30 can be revolved to adjust the amount of registering of passage 31 with 28 and 29 from a full opening to one nearly closed. If the chambers 16 and 17 are inflated and maintained at different pressures the chambers 16 of two rear springs A can be equalized through the tube 19, in which case the chambers 17 can be equalized by connecting them by means of a tube from the boss 34.

Referring now to Figs. 1 and 2, the air container 12 is inclosed in a metal casing 35 having a flange 36 for bolting or riveting to the frame 9. The bottom cover 37 is provided for supporting the air container 12 in the casing 35 and as a convenient means of mounting or replacing said air container. Around the circumference of the casing 35 and the cover 37 are projections 38, 39, 40, and 41 having internal recesses to take the bosses 42, 43, 44, and 45 respectively of the air container 12. These four bosses prevent shifting or creeping of said air container in said casing and cover. Tube 19 is located in boss 42, tubes 20 and 21 in boss 43 and the two parts of the split boss 45 held together on line 18 by the projection 41.

In Fig. 3 is shown a modified construction of air container 47 having a horizontal partition 48 for establishing an upper air chamber 16 and a vertical partition 49 connecting the bottom of said container 47 to the horizontal partition 48 to establish two small lower air chambers 17a. The two chambers 17a are connected to the upper chamber 16 by means of air passages 50 through the partition 48 to equalize the air pressure between said upper and lower chambers. The horizontal partition 48 has an elliptical hole 14 for spool 4 (as in air container 12) and the vertical partition 49 is split on a line 51 for ease in mounting or replacing said air container 47. Boss 42 is the same as on air container 12 while the lower boss 44a is a boss split on the line 51 and held together by the recess of projection 40 on cover 37. The tube in the boss 42 for Fig. 3 is designated as 19a, as where the air springs are equalized it is generally desirable to connect only the two front springs B together by 19a and the two rear springs A together by 19 on account of different pressures.

The modified construction of air container 47 is adapted to be used in the casing 35 and cover 37 but a similar casing 35a and 37a can be provided without the projections 39 and 41 as is shown in Figs. 4 and 5 for a front axle where the fixed form of air passages or equalizers 50 is preferred as well as the smaller air chambers 17a. In Figs. 4 and 5 my pneumatic spring B is shown replacing a front car spring 52 (shown dotted), the casing 35a attached to the frame 9 and the spool 4 attached to the usual I section front axle 53 by means of a rod 54. Where my improved spring is originally installed on cars it is preferable to have the front axle pass through the spool 4 which is adapted to take the form of axle used. With my springs therefore the frame of the car could be straight or with only a single drop, instead of the double drop as shown in Fig. 6, to have a low body design.

In Fig. 6 is shown a car frame 9 and my pneumatic spring A cooperating with a rear axle 2 and my pneumatic spring B cooperating with a front axle 53. This figure illustrates my method of installing a radius rod 55 from the rear axle to the rear end of the frame 9, and a radius rod 56 from the front axle 53 to the front end of the frame 9 when found necessary. These radius rods 55 and 56 are preferably made of a single leaf of spring steel, one each for the springs and pivoted to the ends of the frame as shown to allow for the movement of the axles vertically. The radius rods are for the purpose of preventing an excessive displacement of the axles forward and rearward in relation to the pneumatic springs, as when the air containers become too soft from deflation. These radius rods also show a means of taking all or part of the drive from the springs.

If an air container loses its pressure, no particular harm can result as the frame of the car will be lowered until the bumper 7 rests on the bumper 6 and can ride that way until a new air container can be installed. To remove an air container it is deflated, the tube 19 disconnected, cover 37 removed and the car frame jacked up to allow the axle and air container to separate from the casing 35 when the air container is removed from the spool 4 by opening it where it is split.

In Fig. 1 the left hand air container 12 at the top is shown as not snugly fitting at all points the inside of the casing 35 while at the bottom it is shown as snugly fitting the cover 37. The right hand air container (referred to as 12') is shown in a reverse position, i. e. the container 12' does not snugly fit the cover 37 while it does fit the casing 35 and is somewhat distended as at 57 between the casing 35 and the spool 4'. As shown in Fig. 2 the movement of the axle 2 and spool 4 is allowed for by a greater space 58 between the spool 4 and the casing 35 than the space 59 between the spool 4 and cover 37.

Assuming that the frame 9 of the car is maintained at a constant distance from the road surface in traveling over it, the left hand portion of the axle housing 3 might be assumed to have dropped away from the car frame, as when the wheel 1 drops into a depression, while the right hand portion of the axle housing 3' might be assumed to have been raised by wheel 1' hitting a bump. In actual running conditions the wheels and axles are not only raised and lowered in relation to the car frame and body but the frame and body are raised and lowered in relation to the road. The relation of the air container 12 to its casing 35 and cover 37 may obtain when the car is standing and depending on the load in the car and the amount of air pressure in said container. However the air container 12 will ordinarily fit the casing and the cover 35 and 37 respectively when inflated to its normal pressure to hold the car body in a floating relation to the axles and to take care of the drive, torque, side sway and shifting of body in relation to axles in rounding corners as well as the suspension and shock absorbing.

The car tires take care of the drive and braking effects exerted on them and the shifting of the total car and axle weight in relation to the road in rounding corners by simply the friction of the inside of the inflated tires on the wheel rims while making contact with the road on the circumference at one spot. In my spring suspension an opposite condition prevails in that the air container is supported around its outer circumference by the casing and cover and the air in the different chambers acted on from the inside partition.

The casing 35 being attached to a car frame 9 and the spool 4 being attached to the axle housing as 3 the downward thrust of the weight of the car will act by means of the top of the air container 12 on the air in the chamber 16 and will be opposed by the upward supporting thrust of the axle to react by means of the partition 13 on said air. A sudden upward thrust of the axle as caused by a wheel hitting an obstruction on the road will flex the partition 13 and compress the air in chamber 16 to carry the car body upward and at the same time forcing air into the lower chamber 17 through the air passages connecting them. This brings the axle nearer the body and an excessive action is checked by the bumpers 6 and 7. The axle and body then separate and compress air in the lower chamber 17 to force air back into the upper chamber 16.

The larger upper chamber 16 will support a greater load than the smaller lower chamber 17 with the same or equalized pressure in both chambers and with a relatively equal distortion for the different chambers on account of the larger cubic contents in chamber 16. The greater load of the car and its passengers is therefore resiliently supported by the air in the larger upper chamber 16 of the container 12 and the lesser load, as rebound of the axle, is taken care of by the air in the smaller lower chamber.

It is to be understood that minor variations in the shape and arrangements of parts may be used to accomplish my results, as the specified elliptical hole 14 may be described as oblong or rectangular or irregular to grip the spool 4 and 5, control the torque without departing from the spirit of the invention.

Having thus described my invention what I claim and desire to secure by Letters Patent is:

1. A pneumatic spring for vehicles comprising a substantially circular casing and cover, projections on said casing, means to attach said casing to a vehicle frame, a resilient air container in said casing and cover including a partition below the center of said container to divide said container into a large upper chamber and a smaller lower chamber, means to form an air passage between said upper and lower chambers, bosses on said container to cooperate with the projections on said casing, and means extending transversely through said partition to connect said spring to the axle of said vehicle.

2. A pneumatic spring for vehicles comprising a casing and cover, means to attach said casing to a vehicle frame, a resilient air container in said casing including a partition to divide said container into a large upper chamber and a smaller lower chamber, a boss on the outside of said container forming a continuation of said partition, means to form an oblong hole transversely through said partition, means to provide a split from said hole through said partition and boss, means on said casing to inclose said split boss, a spool having end flanges to fit said oblong hole and connect said container by means of its partition to said vehicle axle.

3. A pneumatic spring for vehicles comprising a casing and cover, means to attach said casing to a vehicle frame, a resilient air container in said casing including a partition to divide said container into a large upper chamber and a smaller lower chamber, air passage means between said upper and lower chambers, means to vary the size of said air passage means, a spool in said partition extending transversely through said container, end flanges on said spool to inclose the sides of said container, said spool connecting said spring to the axle of said vehicle.

4. The combination with a motor vehicle having a frame and an axle, of a pneumatic spring adjacent each end of said axle, each spring comprising a resilient air container supported around its circumference in a casing and cover attached to said frame and a spool fitting an oblong hole through said container and attached to said axle, said container including a partition dividing said container into a large upper chamber and a smaller lower chamber and forming means to provide said oblong hole through said container, air passage means to connect the upper chambers of said springs and air passage means to connect the lower chambers of said springs.

5. The combination with a motor vehicle having a frame and axles connected through radius rods pivoted to the ends of said frame; of a pneumatic spring adjacent each end of said axles, each spring comprising a substantially circular resilient air container supported around the circumference of said container by means attached to said frame and attached on the axle by mounting on means extending through said container, a casing and cover inclosing said container as means to attach said container to said frame, a spool as mounting means to attach said container on the axle, said container including a partition to provide means for mounting on said spool and to divide said container into a large upper chamber and a small lower chamber and air passage means between said upper and lower chambers whereby said upper chamber acts as resilient means between the said casing and said axle and said lower chamber acts as a resilient means between said casing cover and said axle.

6. In a device of the character described, a resilient air container substantially circular in side elevation and oval in transverse elevation, a horizontal partition below the center of said container to divide said container into a large upper chamber and a smaller lower chamber, passage means between said chambers and means to vary the size of said latter passage means.

7. In a device of the character described, a resilient air container having large and small chambers, partition means to divide said container into said chambers, means to form an oblong hole transversely through the partition of said container and air passage means to connect said large and small chambers, said container split from the outside to said hole through said partition means.

8. In a device of the character described, a resilient air container having a large upper chamber and a small lower chamber, a partition to separate said chambers and means to form an oblong hole transversely through said partition, said air container divided from the outside through one end of said partition to said hole.

9. In a device of the character described, a resilient air container having a large and a small air chamber, a partition to separate said chambers and means to form an elliptical hole transversely through said partition.

10. In a device of the character described, a resilient air container having upper and lower air chambers of different sizes, means to attach said container to a vehicle frame, a partition to separate said chambers and form means to support the vehicle axle therethrough independently of said frame, means to inflate said chambers, means connecting said air chambers by passages to equalize the air pressure in said chambers and means to regulate the amount of opening through said pasages.

11. In a device of the character described, a resilient circular air container, a partition below the center of said container dividing said container into a large upper chamber and a small lower chamber, air passage means to connect said chambers and means to form an elliptical hole through said partition with its major axis in line with said partition.

12. In a device of the character described, a resilient air container, a partition to separate said container into chambers, casing means to attach said container to the frame of a vehicle and means to form an opening through said partition whereby said partition forms a support for the axle of a vehicle independent of the frame of said vehicle and whereby the torque of said axle is absorbed by said partition.

HERSCHEL D. SMITH.